United States Patent Office 2,925,406
Patented Feb. 16, 1960

2,925,406
POLYTHIAALKYLACRYLATES

Richard M. McCurdy, St. Paul, and Julianne H. Prager, Roseville, Minn., assignors to Minnesota Mining and Manufacturing Company, St. Paul, Minn., a corporation of Delaware No Drawing. Application April 8, 1957
Serial No. 651,164

8 Claims. (Cl. 260—79.5)

This invention relates to a novel class of useful polymers and more particularly to certain polythiaalkylacrylates.

The polymers coming within the scope of the invention are typified by the presence of recurring units which can be represented by the formula

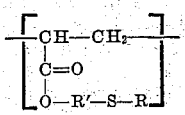

wherein R and R' are linear hydrocarbon residues, R being monovalent and R' divalent, and the sum of the carbon atoms of R and R' is from 3 to 7.

The physical properties of the polymers are dependent upon their molecular weight, lower members of the series being viscous liquids while polymers of high average molecular weight are solid elastomers.

It is an object of this invention to provide polymers which are both flexible at low temperatures and resistant to paraffinic solvents. Another object of the invention is to produce useful polymers which are resistant toward mercaptans. A still further object of the invention is to provide monomers and low polymers which are suitable for copolymerization with other polymerizable substances. Other objects of the invention will be apparent from the disclosure hereinafter set forth.

In accordance with these objects it has been found that higher polymers of the present invention are easily and relatively cheaply prepared elastomers which have outstanding resistance to paraffinic hydrocarbon solvents, over a wide range of temperatures. Thus they have distinct advantages since elastomers possessing these properties find specific applications in military and civilian aircraft in sealing joints, hoses, connections and the like where pressure resistance and elasticity are required under the conditions of extremely low temperatures often prevailing at high altitudes, while resistance to solvents such as hydrocarbon fuels is necessary. The less costly nature and ready accessibility of the novel elastomers of the invention permits the liberal application of these outstanding materials in instances where additional safety may warrant employing a superior product but cannot justify use of a very expensive product. It is evident that similar and other uses are possible in the automotive industry. The polymers of the present invention further lend themselves well to formulation of pressure-sensitive adhesives having resistance to paraffinic oils. They further combine with their desirable low temperature properties and resistance to hydrocarbons, resistance to mercaptans of the type found in sour crude oils making them of value for applications where exposure to crude oils prevails, as, for example, in and around oil wells and refineries, in pump parts, packings, gaskets and the like. The polymers of the present invention possess a further advantage in that they are not reducible so as to free sulfhydryl groups, for example, under electrolytically corrosive conditions; and therefore they do not have a tendency to attack iron or other susceptible metals under these conditions.

In the measurement of properties of elastomeric polymers it is useful for estimation of utility at low temperatures to define a temperature region in which there is a change in properties from a rubbery to a brittle condition. This point is commonly designated the "glass temperature," symbolized $T_g$, sometimes called glass transition temperature (cf. P. T. Flory, Principles of Polymer Chemistry, Cornell University Press, 1953). The method employed herein for measuring this value is that described in the Journal of Polymer Science, volume 3, pages 455 to 461 and 647 to 651. The resistance of the elastomers to solvents is measured herein by a standard method, ASTM Procedure D471–54T. At temperatures below the glass temperature an elastomeric polymer becomes more or less frangible, which is highly undesirable for many purposes. A low value of $T_g$ is therefore evidence of utility at comparably low temperatures. For maximum utility for the purposes described herein, it is obvious that the value must be coupled with good solvent resistance. While some skill in compounding the rubber manufactured using the elastomer can lead to somewhat greater utility at temperatures close to the glass temperature, this has heretofore generally been accomplished at the expense of resistance to solvents and mechanical properties. Particular advantages can be obtained by copolymerizing an amount of the monomers herein employed with an equimolar or smaller amount of polymerizable ethylenically unsaturated monomers of the vinyl type, since then the above described advantages of the homopolymers of the present invention are incorporated substantially proportionally into the resulting copolymers and in addition some internal plasticization is effected. As examples of such comonomers suitable for use herein may be mentioned vinyl chloride, styrene, methyl and ethyl acrylates, acrylic acid, methyl and ethyl methacrylates, N-vinyl pyridine and the like.

The polymers of the invention are obtained by polymerization of acrylate esters of thiaalkanols. The acrylate ester monomers are conveniently prepared by reacting the selected thiaalkanol with acrylic acid or with a slight excess of acrylyl chloride in inert solvent solution, and in the presence of a basic material, for example, such as a slight stoichiometric excess of anhydrous triethylamine. The following equation, in which R and R' have the same significance as that set forth hereinabove, serves to illustrate the course of the reaction where acrylic acid is employed:

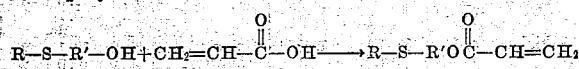

The thiaalkanols used as starting materials can be prepared by the reaction of sodio derivatives of mercaptans containing the R radical, with the selected chloroalkanol containing the R' radical, wherein R and R' have the significance defined hereinabove.

Illustrative thiaalkylacrylate esters of the invention are, for example, 3-thiabutyl acrylate, 3-thiahexyl acrylate, 6-thiaoctyl acrylate, 4-thiaoctyl acrylate, 3-thiaheptyl acrylate and 4-thiapentyl acrylate.

The homopolymers and copolymers of the thiaalkyl acrylates can be prepared by polymerization of the monomers by any of the processes known to the art, such as bulk polymerization and solution polymerization, using the usual catalysts, for example, alkali metal salts of persulfuric acid, peroxides, diazo initiators and the like. To produce polymers of lower average molecular weight, including liquid polymers, mercaptan or other chain transfer agents are employed. Preferably, they are polymerized by emulsion-type polymerization processes. The resulting stable latices, which can contain up to about 35% solids, can be used as such, for incorporation into paints, paper treatment and the like; but preferably the elastomer is isolated and compounded with fillers, vulcanizing agents and the like to produce rubber having useful properties in applications such as gaskets, seal rings and the like.

The following examples, which are included for illustrative purposes, and which do not limit the scope of the invention, will more specifically describe the preparation and properties of the monomers and polymers of the invention. In the examples, all parts are by weight unless otherwise specified.

EXAMPLE 1

In a vessel equipped with mechanical stirrer, thermometer and reflux condenser, 100 parts of ethanethiol were neutralized by the careful addition of 290 parts of 25% sodium hydroxide solution at such a rate that the temperature did not exceed 20° C. To the resulting clear solution were then added 145 parts of ethylene chlorohydrin at a rate such that the temperature did not exceed 60° C. Stirring was continued for one hour, after which the organic layer was taken up in 150 ml. of benzene, washed successively with 15% sodium hydroxide solution and water, the solution dried over anhydrous calcium sulfate and fractionally distilled under reduced pressure. The 3-thiapentanol-1 thus prepared boiled at 67°/7 mm.

To an ice cold solution of 248 parts of 3-thiapentanol-1 and 259 parts of anhydrous triethylamine in 900 parts of benzene in a vessel equipped with stirrer and thermometer was added gradually a solution of 222 parts of acrylyl chloride in 400 parts of benzene. The temperature of the reaction mixture was maintained at 15° C. by cooling the vessel in an ice bath. The reaction mixture was filtered, washed with dilute hydrochloric acid and water, dried, and distilled. The resulting 3-thiapentyl acrylate boiled at 60–62° C./0.5 mm.

Using substantially the above described procedure and sequence of reactions, other thiaalkanols and their acrylates were prepared. These were characterized by boiling points, refractive indices and analytical results as shown in the following tables:

Table I.—Thiaalkanols

| | B.P., °C. | $n_D^{25}$ | Analysis | C | H | S |
|---|---|---|---|---|---|---|
| 3-thiabutanol-1 | 74–8/23 mm. | 1.4891 | Calculated | 39.1 | 8.8 | 34.8 |
| | | | Found | 38.2 | 9.1 | 34.2 |
| 3-thiapentanol-1 | 78–81/21 mm. | 1.4841 | Calculated | 45.2 | 9.5 | 30.2 |
| | | | Found | 45.1 | 9.5 | 29.7 |
| 4-thiapentanol-1 | 52–5/1.5 mm. | 1.4859 | Calculated | 45.2 | 9.5 | 30.2 |
| | | | Found | 45.4 | 9.5 | 30.1 |
| 4-thiahexanol-1 | 85–6/5 mm. | 1.4830 | Calculated | 50.0 | 10.1 | 26.7 |
| | | | Found | 49.8 | 9.8 | 26.4 |
| 5-thiahexanol-1 | 81–5/3 mm. | 1.4856 | Calculated | 50.0 | 10.1 | 26.7 |
| | | | Found | 49.2 | 10.0 | 26.8 |

Table II.—Thiaalkyl acrylates

| | B.P., °C. | $n_D^{25}$ | Analysis | C | H | S |
|---|---|---|---|---|---|---|
| 3-thiabutyl acrylate | 60/4 mm. | 1.4790 | Calculated | 49.3 | 6.9 | 21.9 |
| | | | Found | 49.5 | 6.8 | 21.7 |
| 3-thiapentyl acrylate | 83–5/7 mm. | 1.4763 | Calculated | 52.5 | 7.6 | 20.0 |
| | | | Found | 52.6 | 7.5 | 20.1 |
| 4-thiapentyl acrylate | 52–5/1.3 mm. | 1.4778 | Calculated | 52.5 | 7.6 | 20.0 |
| | | | Found | 52.7 | 7.6 | 20.0 |
| 4-thiahexyl acrylate | 57–8/0.5; 63–5/3 mm. | 1.4770 | Calculated | 55.1 | 8.1 | 18.4 |
| | | | Found | 55.1 | 7.9 | 18.4 |
| 5-thiahexyl acrylate | 81–5/3 mm. | 1.4856 | Calculated | 55.1 | 8.1 | 18.4 |
| | | | Found | 55.2 | 8.0 | 18.5 |

EXAMPLE 2

A mixture of 100 parts of 3-thiapentyl acrylate, 180 parts of water, 5 parts of sodium lauryl sulfate and 0.5 parts each of sodium persulfate and sodium bisulfite was placed in a suitable reaction vessel. The air in the vessel was then displaced by nitrogen, suitably by flushing with a stream of nitrogen for at least 2 minutes, and the vessel was sealed in a nitrogen atmosphere and transferred to a water bath at about 50° C. in which it was agitated by shaking for about 3 hours. The polymer which was formed was a pale bluish latex, from which the solid polymer was recovered by coagulation in about two volumes of methanol. The precipitated polymer was washed with water and dried. It was a rubbery, virtually colorless mass. This polymer is comprised of recurring units having the formula

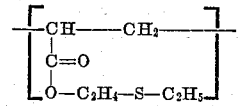

Other polymers were prepared by the same procedure from the acrylates of Table II. The polymers were all rubbery, almost colorless materials.

The glass temperature and solvent resistance of the above polymers were determined by the methods referred to hereinabove and compared with the values obtained for other polymers including some of those of analogous structure in which an oxygen atom or methylene group occupied the position of the sulfur atom in the present polymers. The results obtained are set forth in Table III.

TABLE III

| Monomer employed | Glass Temperature (°C.) | Volume percent swell in 70:30 isooctane-toluene |
|---|---|---|
| 3-thiabutyl acrylate | −60 | 9 |
| 3-thiapentyl acrylate | −71 | 31 |
| 4-thiapentyl acrylate | −65 | 32 |
| 4-thiahexyl acrylate | −76 | 36 |
| 5-thiahexyl acrylate | −70 | 36 |
| 3-oxabutyl acrylate | −50 | 30 |
| 3-oxapentyl acrylate | −50 | 50 |
| 4-oxahexyl acrylate | −68 | 130 |
| n-butyl acrylate | −70 | >100 |
| n-pentyl acrylate | −76 | >200 |

From the tabulated results it is seen that the polymers of the present invention have much better solvent resistance than similar polyalkylacrylates, which are swollen to the extent of over 100% by the solvent mixture employed. The polythiaalkyl-acrylates of this invention have significantly better glass temperatures than the polyoxaalkyl acrylates. It is in fact surprising that although replacement of a methylene group by an oxa group raises the glass temperature, introduction of the even larger thia group results in lowering of the glass temperatures and marked improvement in solvent resistance. The class of polymers of the present invention consequently is a group possessing an unusual and unpredictable combination of properties of low glass temperatures and excellent solvent resistance.

The thiaalkyl acrylate polymers of the present invention are readily vulcanizable to compounded rubbers possessing unusually good physical properties, as shown in the following example.

EXAMPLE 3

A mixture of the following ingredients in which parts are by weight was compounded:

| | Parts |
|---|---|
| Poly 3-thiapentylacrylate | 100 |
| Carbon black | 35 |
| Sulfur | 2 |
| p-Benzoquinone dioxime | 2 |
| "Di-Cup" 40/C (40% commercial dicumyl peroxide) | 5 |

The mixture was compounded by successively incorporating the respective ingredients into the elastomer in a cold rubber mill. The compounded stock was then vulcanized in steel molds at 310° F. for 30 minutes under pressure to give a sheet about 0.1 inch thick. A sample was cut from the sheet in a dumbbell shape and was then clamped in the jaws of an elongation testing device and stretched. A pull of 854 p.s.i. of minimum initial cross-section was required for 100% elongation and the sample broke at 1240 p.s.i. at which point it had elongated 150%. There was a 12.5% deformation at this point indicating an amount of non-elastic stretching.

Portions of this same material were tested to determine the temperature of brittleness ($T_B$) and the temperature at which flexing resistance was tenfold that of room temperature ($T_{10}$), by the ASTM Procedures D746–55T and D1053–54T, respectively. The values were —44 to —48° F. and —43° F., respectively.

Further samples were tested for solvent resistance against a variety of solvents. These tests were performed by ASTM Procedure D471–54T at room temperature unless indicated otherwise:

| Solvent: | Volume percent swell |
|---|---|
| Benzene | 201.7 |
| Acetone | 130 |
| Ethyl acetate | 151.5 |
| Ethanol | 3 |
| 70:30 isooctane-toluene | 19.1 |
| Water at 212° F. | 251.2 |
| 70:30 isooctane-toluene at 180° F. | 70 |

The other polymers of the invention described in Example 2 when substituted for polythiapentylacrylate in the compounding formula set forth above gave rubbers of comparable properties.

EXAMPLE 4

A mixture of 95 parts of 3-thiapentyl acrylate, 5 parts of acrylic acid, 270 parts of water, 5 parts of the sodium salt of alkyl aryl polyether sulfonate, 1 part of potassium persulfate and 0.5 part of sodium bisulfite was placed in a suitable vessel, the air flushed out with nitrogen and the whole then heated at 50° C. with agitation for 4 hours. The bluish latex which formed was coagulated and the polymer worked up as in Example 2. The rubbery copolymer had $T_B$ determined as in Example 3 of —36° C. and volume percent swell in 70:30 isooctane-toluene of 27%.

We claim:
1. Polymeric 3-thiabutyl acrylate.
2. Polymeric 3-thiapentyl acrylate.
3. Polymeric 4-thiapentyl acrylate.
4. Polymeric 4-thiahexyl acrylate.
5. Polymeric 5-thiahexyl acrylate.
6. A polymer of a compound of the formula:

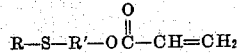

wherein R′ is a divalent alkylene hydrocarbon group and R is an alkyl group, the sum of the carbon atoms in R′ and R being 3 to 7.

7. A copolymer of a compound of the formula:

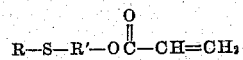

wherein R′ is a divalent alkylene hydrocarbon group and R is an alkyl group, the sum of the carbon atoms in R′ and R being from 3 to 7, and an equimolar or smaller amount of a monoethylenically unsaturated vinyl compound.

8. As an article of manufacture, a vulcanized composition containing a polymer of a compound of the formula:

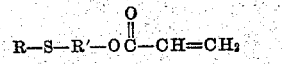

wherein R′ is a divalent alkylene hydrocarbon group and R is an alkyl group, the sum of the carbon atoms in R and R′ being from 3 to 7, said composition having been vulcanized with sulfur.

References Cited in the file of this patent

Reppe: Ann. 582, 1–37 (1953). Abstracted in C.A. 48, 11306, 7 (1954). Copy in Library.